US012691463B2

(12) United States Patent
Toyoshima et al.

(10) Patent No.: US 12,691,463 B2
(45) Date of Patent: Jul. 28, 2026

(54) LIQUID DROPLET FORMING APPARATUS

(71) Applicants: Nobuaki Toyoshima, Kanagawa (JP); Takahiko Matsumoto, Kanagawa (JP); Yusuke Nonoyama, Kanagawa (JP); Daisuke Arai, Tokyo (JP); Hidekazu Yaginuma, Kanagawa (JP)

(72) Inventors: Nobuaki Toyoshima, Kanagawa (JP); Takahiko Matsumoto, Kanagawa (JP); Yusuke Nonoyama, Kanagawa (JP); Daisuke Arai, Tokyo (JP); Hidekazu Yaginuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 123 days.

(21) Appl. No.: 18/605,946

(22) Filed: Mar. 15, 2024

(65) Prior Publication Data

US 2024/0326077 A1 Oct. 3, 2024

(30) Foreign Application Priority Data

Mar. 27, 2023 (JP) ................................ 2023-049895

(51) Int. Cl.

*B05B 15/25* (2018.01)
*B01L 3/02* (2006.01)
*B05B 1/02* (2006.01)

(52) U.S. Cl.

CPC ................ *B05B 15/25* (2018.02); *B05B 1/02* (2013.01); *B01L 3/0293* (2013.01); *B01L 2400/04* (2013.01)

(58) Field of Classification Search

CPC ......... B05B 15/25; B05B 1/02; B01L 3/0293; B01L 3/0237; B01L 3/0241; B01L 2400/0487; B01L 2400/04

(Continued)

(56) References Cited

U.S. PATENT DOCUMENTS 5,035,150 A * 7/1991 Tompkins .......... G01N 35/1016 436/180
9,091,670 B2 * 7/2015 Shvets .................... B01L 13/02

(Continued)

FOREIGN PATENT DOCUMENTS

EP 4 050 091 A1 8/2022
JP 4213014 B2 1/2009

(Continued)

OTHER PUBLICATIONS

Extended European Search Report issued Aug. 2, 2024 in European Patent Application No. 24162900.5, 7 pages.

*Primary Examiner* — David J Walczak
(74) *Attorney, Agent, or Firm* — XSENSUS LLP

(57) ABSTRACT

A liquid droplet forming apparatus capable of stably ejecting dispersion liquid, as liquid droplets, containing settling particles having constant concentration. A liquid droplet forming apparatus includes an ejection head that has a liquid chamber storing liquid containing settling particles and that ejects a liquid droplet of the liquid, stirrer for stirring the liquid held in the liquid chamber, posture controller for controlling a posture of the stirrer, and a control unit that controls operations of the ejection head, the stirrer, and the posture controller, in which the stirrer includes a tube-like member inserted into the liquid chamber, and a liquid feeding portion that sucks or discharges the liquid stored in the liquid chamber via the tube-like member, and the posture controller controls one or both of the position and the direction in which the stirrer sucks and discharges the liquid in the liquid chamber.

10 Claims, 8 Drawing Sheets

(58) Field of Classification Search
USPC .......................... 222/226, 229, 232, 234–236
See application file for complete search history.

(56) References Cited

U.S. PATENT DOCUMENTS

| | | | | |
|---|---|---|---|---|
| 2013/0095469 | A1* | 4/2013 | Koltay | G01N 15/1404 435/286.4 |
| 2019/0232661 | A1 | 8/2019 | Akai et al. | |
| 2022/0118438 | A1 | 4/2022 | Schöndube | |

FOREIGN PATENT DOCUMENTS

| | | | |
|---|---|---|---|
| JP | 2020-151939 | A | 9/2020 |
| JP | 7062974 | B2 | 5/2022 |

* cited by examiner

LIQUID DROPLET FORMING APPARATUS

CROSS-REFERENCE TO RELATED APPLICATION

The present application claims priority under 35 U.S.C. § 119 to Japanese Patent Application No. 2023-049895, filed Mar. 27, 2023. The contents of which are incorporated herein by reference in their entirety.

BACKGROUND OF THE INVENTION

Field of the Invention

The present invention relates to a liquid droplet forming apparatus.

Description of Related Art

In the related art, an ink jet type liquid droplet forming apparatus is known as a technique for ejecting a liquid substance (liquid) such as ink to a desired position.

In recent years, there has been demand for a liquid droplet forming apparatus which can eject various types of liquid in place of ink used in two-dimensional printing in the related art. Exemplary examples of the liquid to be ejected include dispersion liquid as well as a solution. Exemplary examples of dispersoids (particles) contained in the dispersion liquid include organic materials such as resin materials, inorganic materials such as metal particles and oxide particles, and biologically derived materials such as cells and genes.

In a case where the above-described dispersion liquid is ejected in a liquid droplet forming apparatus, dispersoids may settle in a liquid chamber. In the following description, the dispersoids that settle in the dispersion liquid may be referred to as "settling particles". In a case where settling particles settle, the concentration of settling particles contained in the liquid to be ejected changes even in a case where the amount of liquid droplets to be ejected is constant, which makes it difficult to stably eject a desired amount of dispersoids.

In response to such a problem in the related art, in a liquid droplet forming apparatus that stores dispersion liquid containing settling particles, a configuration having two liquid suction-discharge members connected to a liquid holding portion has been proposed (for example, see Japanese Patent No. 7062974). In the apparatus in Japanese Patent No. 7062974, liquid is stirred by synchronizing operations of the two liquid suction-discharge members, suctioning the dispersion liquid stored in the liquid holding portion using one of the liquid suction-discharge members, and discharging the dispersion liquid using the other of the liquid suction-discharge members.

SUMMARY OF THE INVENTION

In the configuration of Japanese Patent No. 7062974, the settling particles are likely to be accumulated in the corner of the liquid holding portion, and it is difficult to stably eject liquid droplets containing settling particles having constant concentration.

The present invention has been made in view of such circumstances, and an object of the present invention is to provide a liquid droplet forming apparatus capable of stably ejecting dispersion liquid, as liquid droplets, containing settling particles having constant concentration.

In order to solve the above problems, one aspect of the present invention provides a liquid droplet forming apparatus including: an ejection head that has a liquid chamber storing liquid containing settling particles and that ejects a liquid droplet of the liquid; stirrer for stirring the liquid held in the liquid chamber; posture controller for controlling a posture of the stirrer; and a control unit that controls operations of the ejection head, the stirrer, and the posture controller, in which the stirrer includes a tube-like member inserted into the liquid chamber, and a liquid feeding portion that sucks or discharges the liquid stored in the liquid chamber via the tube-like member, and the posture controller controls one or both of the position and the direction in which the stirrer sucks and discharges the liquid in the liquid chamber.

In the present invention, it is possible to provide a liquid droplet forming apparatus capable of stably ejecting dispersion liquid, as liquid droplets, containing settling particles having constant concentration.

DETAILED DESCRIPTION OF THE INVENTION

First Embodiment

A liquid droplet forming apparatus according to a first embodiment of the present invention will be described below with reference to FIGS. 1 to 5. In all the following drawings, dimensions, proportions, and the like of each constituent element have been appropriately changed in order to make the drawings easier to see.

Figure 1:
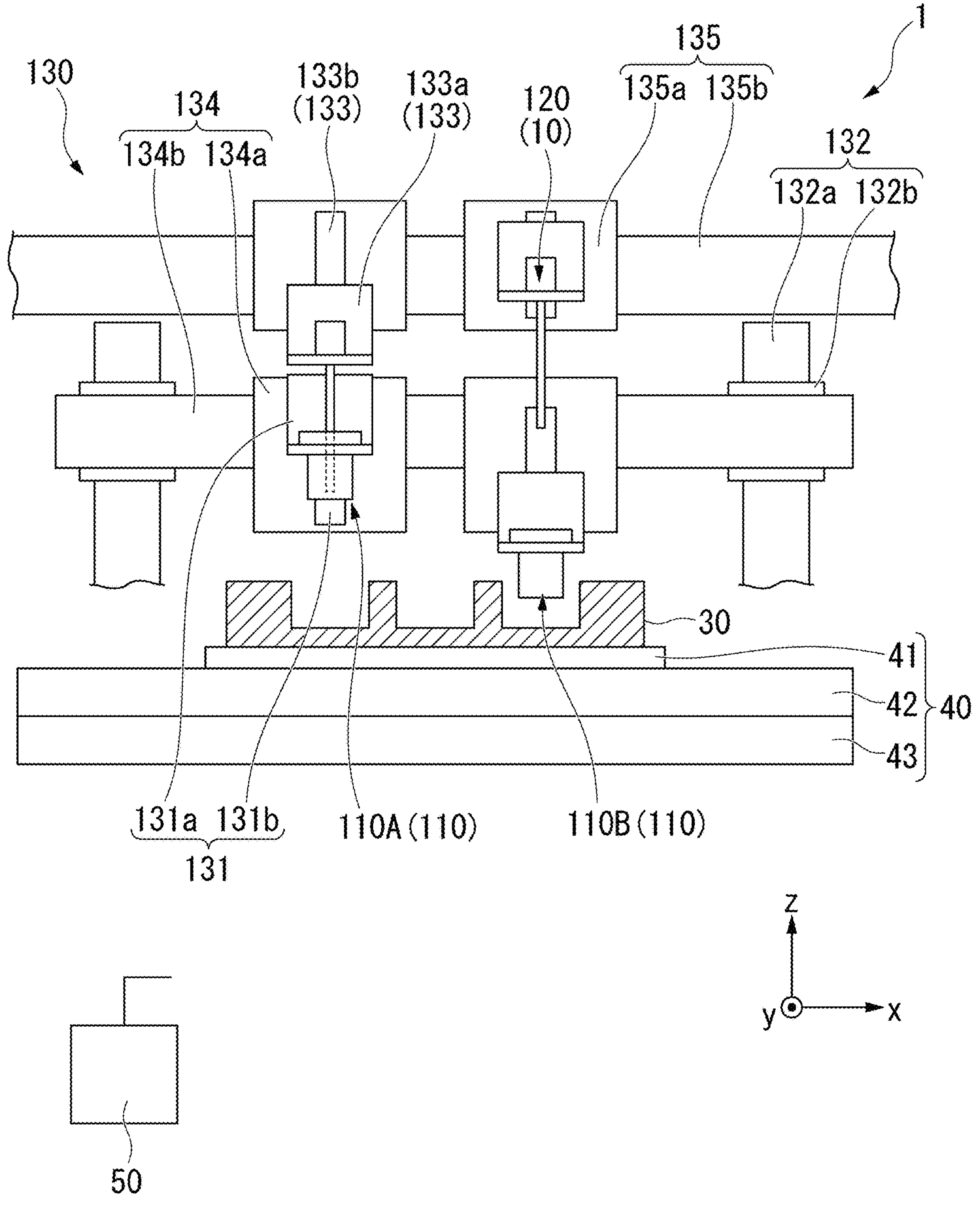
FIG. 1 is a schematic view of a liquid droplet forming apparatus 1 of a first embodiment.
Figure 2:
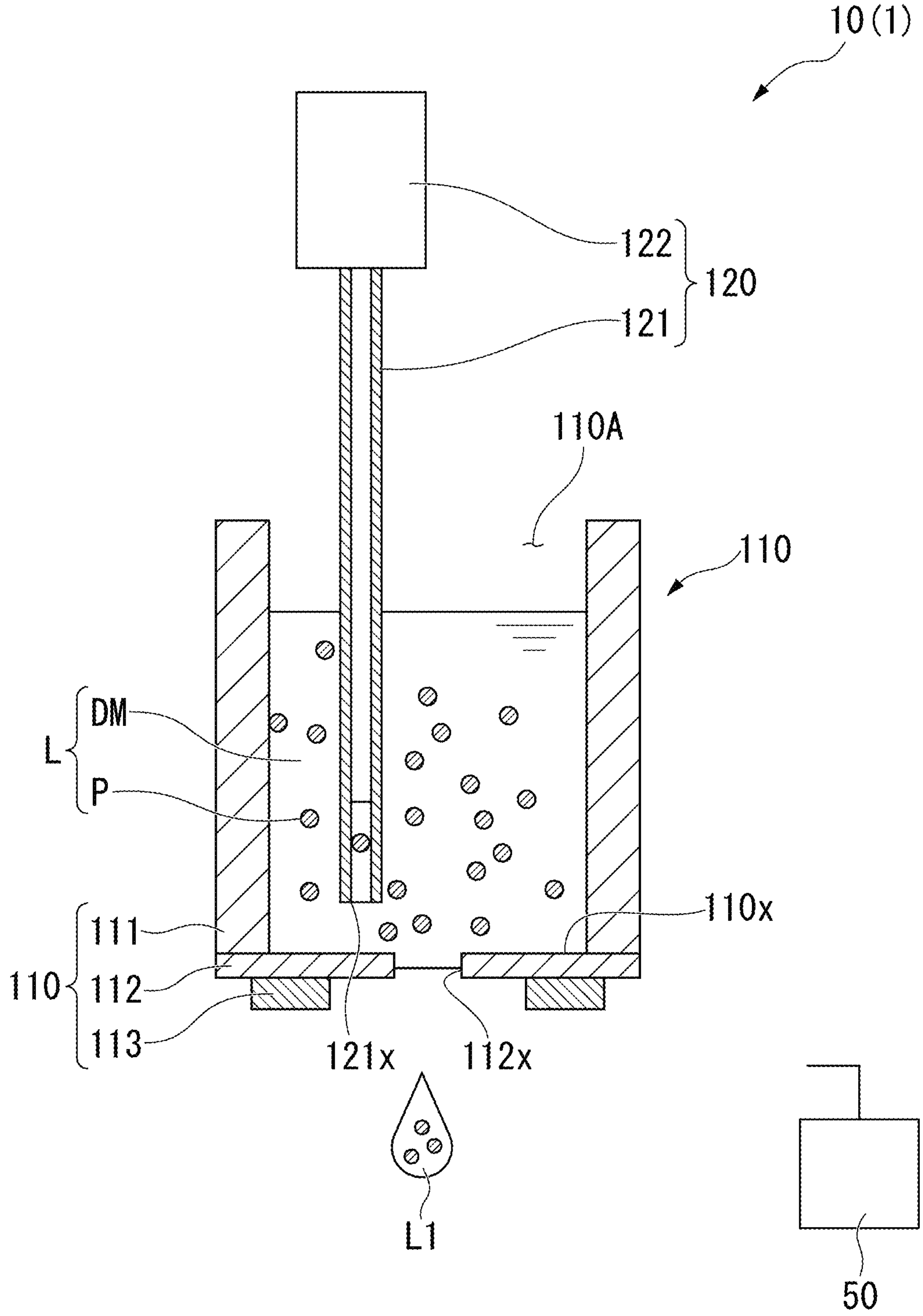
FIG. 2 is a schematic view illustrating a configuration of a part of an ejecting portion 10.

FIG. 1 is a schematic view of a liquid droplet forming apparatus 1 of the present embodiment. As illustrated in FIG. 1, the liquid droplet forming apparatus 1 includes an ejecting portion 10, an adhesion portion 30, a mounting portion 40, and a control unit 50. FIG. 2 is a schematic view illustrating a configuration of a part of the ejecting portion 10.

In the following description, an xyz orthogonal coordinate system is set, and a positional relationship of each member will be described with reference to the xyz orthogonal coordinate system. Here, a predetermined direction within a horizontal plane is defined as an x-axis direction, a direction orthogonal to the x-axis direction within the horizontal plane is defined as a y-axis direction, and a direction (that is, a vertical direction) orthogonal to each of the x-axis direction and the y-axis direction is defined as a z-axis direction.

In addition, an upper part in the vertical direction is defined as a +z direction, and a lower part in the vertical direction is defined as a −z direction. In the following description, the same meanings are applied to the term "up" from "upper part" and "upper surface" and the term "low" from "lower part" and "lower surface".

Further, in the following description, the term "plan view" refers to viewing a target object from above, and the term "planar shape" refers to a shape of the target object as viewed from above.

Ejecting Portion

As illustrated in FIGS. 1 and 2, the ejecting portion 10 includes an ejection head 110, stirrer 120, and moving unit 130. The moving unit 130 corresponds to posture controller in the present invention.

Ejection Head

The ejection head 110 ejects a liquid droplet L1 of liquid containing settling particles. The ejecting portion 10 may include only one ejection head 110 or a plurality of ejection heads 110.

The ejection head 110 includes a liquid holding portion 111, a nozzle plate (film-like member) 112, and vibration applier 113.

A space surrounded by the liquid holding portion 111, the nozzle plate 112, and the vibration applier 113 is a liquid chamber 110A of the ejection head 110. The liquid (liquid L) containing settling particles is held in the liquid chamber 110A.

The amount of the liquid L held in the liquid chamber 110A is not particularly limited. Exemplary examples of the amount of the liquid L held in the liquid chamber 110A include substantially 1 μl to 1 ml. When expensive liquid such as cell suspension is ejected from the liquid droplet forming apparatus 1, it is preferable that the amount of the liquid L held in the liquid chamber 110A is substantially 1 μl to 200 μl.

The liquid L ejected by the liquid droplet forming apparatus 1 contains dispersoids (particles P), which are settling particles, and a dispersion medium DM in which the particles P are dispersed.

Exemplary examples of the particles P include organic materials such as polymer particles, and inorganic materials such as fine metal particles and inorganic oxide particles. Exemplary examples of the fine metal particles include silver particles and copper particles. Exemplary examples of the inorganic fine particles include titanium oxide particles and silicon oxide particles.

Further, cells can also be used as the particles P. As the cells, plant cells or animal cells can be applied. Exemplary examples of the animal cells include, particularly, human-derived cells.

Exemplary examples of the dispersion medium DM include water and alcohol. The dispersion medium DM may contain a wetting agent for suppressing evaporation or a surfactant for lowering surface tension.

In the present embodiment, the liquid L ejected by the liquid droplet forming apparatus 1 will be described as dispersion liquid in which cells are dispersed as the particles P in the dispersion medium DM. In this case, as the dispersion medium DM, known buffer solutions such as phosphate buffered saline or Hank's balanced salt solution, or various cell culture media can be used.

Liquid Holding Portion

The liquid holding portion 111 is a tubular-shaped member of which both end portions are open in the z-axis direction. Exemplary examples of the material of the liquid holding portion 111 include metal, silicon, ceramics, and polymer materials. In the liquid droplet forming apparatus 1 that ejects the liquid L in which cells are dispersed, a material to which cells are not easily adhered is preferable as a material of the liquid holding portion 111. As such a material, a material having high hydrophilicity is preferable.

Exemplary examples of such materials include metal, ceramics, semiconductor materials, and polymer materials. A fluororesin can be used as the polymer material.

A lower end portion of the liquid holding portion 111 is blocked by the nozzle plate 112 and the vibration applier 113. It is preferable that, in a case where cells are used as the particles P, an upper end portion of the liquid holding portion 111 is open. When the upper part of the liquid holding portion 111 is open, the liquid L held in the liquid holding portion 111 is less likely to be pressurized during liquid droplet ejection, and damage to cells can be suppressed.

As the liquid holding portion 111, for example, a member having a cylindrical shape, a truncated cone shape, or a square tubular shape can be used.

The size of the liquid holding portion 111 can be selected according to the shape of the adhesion portion 30 described below. For example, in a case where a known 96 well plate is used as the adhesion portion 30, a cylindrical-shaped member having an outer diameter of 6.0 mm or less can be used as the liquid holding portion. In this case, for example, the inner diameter of the liquid holding portion 111 can be set to 4 mm, and the height can be set to 10 mm.

The volume of the liquid holding portion 111 is not particularly limited and may be appropriately selected according to the purposes.

Nozzle Plate (Film-Like Member)

The nozzle plate 112 is a ring-shaped member having an ejection outlet 112*x*. The nozzle plate 112 blocks the lower end portion of the liquid holding portion 111 and forms the liquid chamber 110A, which holds the liquid L, together with the liquid holding portion 111. An upper surface of the nozzle plate 112 is a bottom surface 110*x* of the liquid chamber 110A. The ejection outlet 112*x* communicates with the liquid holding portion 111.

The planar shape, the size when viewed in a plan view, the material, and the structure of the nozzle plate 112 are not particularly limited and can be appropriately selected according to the purpose.

Exemplary examples of the planar shape of an outer edge of the nozzle plate 112 include a circular shape, an elliptical shape, a rectangular shape, a square shape, and a rhombic shape. For example, in a case where the shape of the outer edge of the nozzle plate 112 is a circular shape, the nozzle plate 112 is a circular ring-shaped member.

The nozzle plate 112 is not supported at an end portion on an ejection outlet 112*x* side and is capable of vibrating up and down (z-axis direction). The nozzle plate 112 vibrates at the end portion on the ejection outlet 112*x* side to apply a downward force to the liquid L in the vicinity of the ejection outlet 112*x*, and the liquid L is ejected from the ejection outlet 112*x* as the liquid droplet L1.

As the material of the nozzle plate 112, it is preferable to use a material having a certain degree of hardness because the nozzle plate 112 may easily vibrate and it may be difficult to immediately suppress the vibration when the nozzle plate 112 is not in the ejection state, in a case where the nozzle plate 112 is too soft.

Further, in a case where the liquid L to be ejected is dispersion liquid of cells, the material of the nozzle plate 112 is preferably a material to which cells do not easily adhere. As such a material, a material having high hydrophilicity is preferable.

Exemplary examples of such materials include metal, ceramics, semiconductor materials, and polymer materials. A fluororesin can be used as the polymer material.

More specifically, exemplary examples of the material of the nozzle plate 112 include stainless steel, nickel, aluminum, silicon dioxide, alumina, and zirconia. Further, it is possible to use a composite material in which a surface of the nozzle plate 112, which is formed with a material different from the above material, is coated with the above-described metal, ceramics, or a synthetic phospholipid polymer (for example, Lipidure, manufactured by NOF Corporation) that mimics the cell membrane.

The opening shape of the ejection outlet 112*x* can be appropriately selected according to the purpose. Exemplary examples of the opening shape of the ejection outlet 112*x* include a circular shape, an elliptical shape, and a square shape. Among them, a circular shape is preferable as the opening shape of the ejection outlet 112*x*.

The average opening diameter of the ejection outlet 112*x* is not particularly limited and can be appropriately selected according to the purpose. In order to prevent clogging of the ejection outlet 112*x* by the dispersoids such as cells dispersed in the liquid L in a case where the liquid L to be ejected is dispersion liquid, it is preferable for the opening shape of the ejection outlet 112*x* to be at least twice the maximum diameter of the dispersoid.

The nozzle plate 112 having a relatively large diameter (for example, 100 m) of the ejection outlet 112*x* also has a large diameter of the liquid droplets to be ejected. Such a nozzle plate 112 is suitable for a case where a large amount of liquid needs to be dispensed because a large amount of liquid can be ejected with a small number of liquid droplets.

On the other hand, the nozzle plate 112 having a relatively small diameter of the ejection outlet 112*x* has a relatively small diameter of the liquid droplets to be ejected. Such a nozzle plate 112 is suitable for the purpose of precisely controlling the number of cells to dispense the cells.

Vibration Applier

The vibration applier 113 vibrates the nozzle plate 112 based on an electrical signal to be input, thereby ejecting the liquid droplet L1 from the ejection outlet 112*x*.

The vibration applier 113 is installed on a lower surface of the nozzle plate 112.

The shape, the size, the material, and the structure of the vibration applier 113 are not particularly limited and can be appropriately selected according to the purpose.

The shape or the disposition of the vibration applier 113 are not particularly limited as long as the effects of the invention are not impaired, and can be appropriately designed in accordance with the shape of the nozzle plate 112. For example, in a case where the planar shape of the nozzle plate 112 is a circular ring shape, it is preferable to provide the vibration applier 113 concentrically around the ejection outlet 112*x*.

A piezoelectric element is suitably used as the vibration applier 113. As the piezoelectric element, for example, it is possible to employ a structure in which electrodes for applying voltage are provided on an upper surface and a lower surface of a piezoelectric material.

In this case, by applying voltage between the upper and lower electrodes of the piezoelectric element through the control unit 50, compressive stress is applied in a lateral direction of a film surface so that it is possible to vibrate the nozzle plate 112 in the up and down direction of the film surface.

The piezoelectric material is not particularly limited and can be appropriately selected according to the purpose, and exemplary examples thereof include lead zirconate titanate (PZT), bismuth iron oxide, metal niobate, barium titanate, and composites of these materials with metals or different oxides. Among them, lead zirconate titanate (PZT) is preferable.

Further, the vibration applier 113 may be a heater made of a material having a linear expansion coefficient different from that of the material of the nozzle plate 112. Such a heater may be patterned on the nozzle plate 112, and the heater may be energized and heated to generate vibration.

Stirrer

The stirrer 120 includes a nozzle (tube-like member) 121 and a liquid feeding portion 122 and stirs the liquid L held in the liquid chamber 110A. The nozzle 121 is inserted into the liquid chamber 110A. The liquid feeding portion 122 sucks or discharges the liquid L stored in the liquid chamber 110A via the nozzle 121.

The nozzle 121 is a tube-shaped member that constitutes a flow path of the liquid L in the liquid chamber 110A and includes an opening portion 121*x* at the tip. The outer diameter of the nozzle 121 is smaller than the inner diameter of the liquid holding portion 111, and can be, for example, set to ½ or less of the inner diameter of the liquid holding portion 111. For example, in a case where a cylindrical-shaped member having an inner diameter of 2.8 mm is used as the liquid holding portion 111, a tube with an outer diameter of 0.8 mm can be used as the nozzle 121.

The material of the nozzle 121 is not particularly limited, and the nozzle 121 can be formed using a resin, a silicon rubber, a metal, or the like. It is preferable to use a general-purpose resin-made thin tube called a disposable tip as the nozzle 121 because replacement is easy.

The liquid feeding portion 122 is a pump that sucks or discharges the liquid L in the liquid chamber 110A via the nozzle 121. A syringe pump or a diaphragm pump can be employed as the liquid feeding portion 122 in the liquid feeding portion 122.

According to such stirrer 120, the liquid L in the liquid chamber 110A can be stirred by inserting the nozzle 121 into the liquid chamber 110A and sucking or discharging the liquid L in the liquid chamber 110A.

Moving Unit

The moving unit 130 includes a first movement portion 131, a second movement portion 132, a third movement portion 133, a first conveying portion 134, and a second conveying portion 135. The moving unit 130, which is posture controller, controls a posture of the stirrer 120. The "posture" of the stirrer 120 is specifically a relative posture of the stirrer 120 with respect to the liquid chamber 110A of the ejection head 110. By controlling the posture of the stirrer 120, one or both of the position of the nozzle 121 of the stirrer 120 and the opening direction of the nozzle 121 are controlled. The moving unit 130 controls the posture of the stirrer 120 and controls the position and opening direction of the nozzle 121.

First Movement Portion

As illustrated in FIG. 1, the first movement portion 131 includes a support member 131*a* and a linear motion portion 131*b*.

The support member 131*a* supports the ejection head 110 in an attachable and detachable manner. Therefore, when the ejection head 110 is contaminated or damaged, the ejection head 110 can be removed from the support member 131*a* and replaced with a new ejection head 110.

The linear motion portion 131*b* is an elongated member that is connected to the support member 131*a* and extends in the z-axis direction. The linear motion portion 131*b* moves the support member 131*a* up and down. The linear motion portion 131*b* can employ, for example, a known linear actuator including a stepping motor as a drive source.

The linear motion portion 131*b* may include an encoder that determines a drive amount of the stepping motor and may be configured to be capable of determining a movement amount of the support member 131*a*.

The first movement portion 131 moves the support member 131*a* up and down by driving the linear motion portion 131*b*. Accordingly, the first movement portion 131 moves the ejection head 110 supported by the support member 131*a* up and down. Specifically, the first movement portion 131 moves the ejection head 110 to a non-ejection position where the liquid L is not ejected from the ejection head 110 and an ejection position where the liquid is ejected from the ejection head 110. FIG. 1 illustrates the ejection head 110 (110A) positioned at the non-ejection position and the ejection head 110 (110B) positioned at the ejection position.

Second Movement Portion

The second movement portion 132 includes a support member 132*a* and a linear motion portion 132*b*. The second movement portion 132 is a pair of members provided at end portions of the first conveying portion 134 on the +x side and the −x side.

The support member 132*a* is a rectangular member in the field of view when viewed from the +y direction and supports the first movement portion 131.

The linear motion portion 132*b* is an elongated member extending in the z-axis direction. The linear motion portion 132*b* moves the support member 132*a* up and down in the z-axis direction. The linear motion portion 132*b* can employ, for example, a known linear actuator including a stepping motor as a drive source.

The second movement portion 132 moves the support member 132*a* in the z-axis direction, thereby moving the ejection head 110 supported by the first movement portion 131 in the z-axis direction.

Third Movement Portion

The third movement portion 133 includes a support member 133*a* and a linear motion portion 133*b*.

The support member 133*a* supports the stirrer 120 in an attachable and detachable manner. Therefore, when the stirrer 120 is contaminated or damaged, the stirrer 120 can be removed from the support member 133*a* and replaced with new stirrer 120.

The linear motion portion 133*b* is an elongated member extending in the z-axis direction and moves the support member 133*a* up and down. The linear motion portion 133*b* can employ, for example, a known linear actuator including a stepping motor as a drive source.

The linear motion portion 133*b* may include an encoder that determines a drive amount of the stepping motor and may be configured to be capable of determining a movement amount of the support member 133*a*.

The third movement portion 133 moves the support member 133*a* up and down by driving the linear motion portion 133*b*. Accordingly, the third movement portion 133 moves the stirrer 120 supported by the support member 133*a* up and down.

First Conveying Portion

The first conveying portion 134 includes a support member 134*a* and a linear motion portion 134*b*.

The support member 134*a* is a rectangular member in the field of view when viewed from the +y direction and supports the ejection head 110 via the first movement portion 131.

The linear motion portion 134*b* is an elongated member extending in the x-axis direction. The linear motion portion 134*b* moves the support member 134*a* horizontally in the x-axis direction. Both ends of the linear motion portion 134*b* are each supported by the support member 132*a* of the second movement portion 132.

The linear motion portion 134*b* can employ, for example, a known linear actuator including a stepping motor as a drive source.

The first conveying portion 134 moves the support member 134*a* in the x-axis direction, thereby moving the ejection head 110 supported by the support member 134*a* in the x-axis direction.

Second Conveying Portion

The second conveying portion 135 includes a support member 135*a* and a linear motion portion 135*b*.

The support member 135*a* is a rectangular member in the field of view when viewed from the +y direction and supports the stirrer 120 via the third movement portion 133.

The linear motion portion 135*b* is an elongated member extending in the x-axis direction. The linear motion portion 135*b* moves the support member 134*a* horizontally in the x-axis direction. The linear motion portion 135*b* can employ, for example, a known linear actuator including a stepping motor as a drive source.

The second conveying portion 135 moves the support member 135*a* in the x-axis direction, thereby moving the stirrer 120 supported by the support member 135*a* in the x-axis direction.

Further, the moving unit 130 is provided with a mechanism that controls a posture of the stirrer 120 in the y-axis direction (the relative posture of the stirrer 120 with respect to the liquid chamber 110A).

Such a configuration can be realized, for example, by making the support member 132*a* of the second movement portion 132 movable in the y-axis direction. Similarly, such a configuration can be realized by making indicating members (not illustrated) that support the linear motion portion 135*b* of the second conveying portion 135 on both sides in the x-axis direction movable in the y-axis direction.

Further, a configuration may be used in which the support member 134*a* is moved in the y-axis direction and the ejection head 110 supported by the support member 134*a* is moved in the y-axis direction, or a configuration may be used in which the support member 135*a* is moved in the y-axis direction and the stirrer 120 supported by the support member 135*a* is moved in the y-axis direction.

When the moving unit 130 has these configurations, the posture of the nozzle 121 in the y-axis direction with respect to the liquid chamber 110A can be controlled.

Adhesion Portion

The adhesion portion 30 is disposed in the ejection direction of the liquid droplet L1 ejected from the ejecting portion 10, and the liquid droplet L1 adheres thereto. As the adhesion portion 30, it is possible to select a structure object having various materials and shapes according to the purpose of ejecting the liquid.

Figure 3:
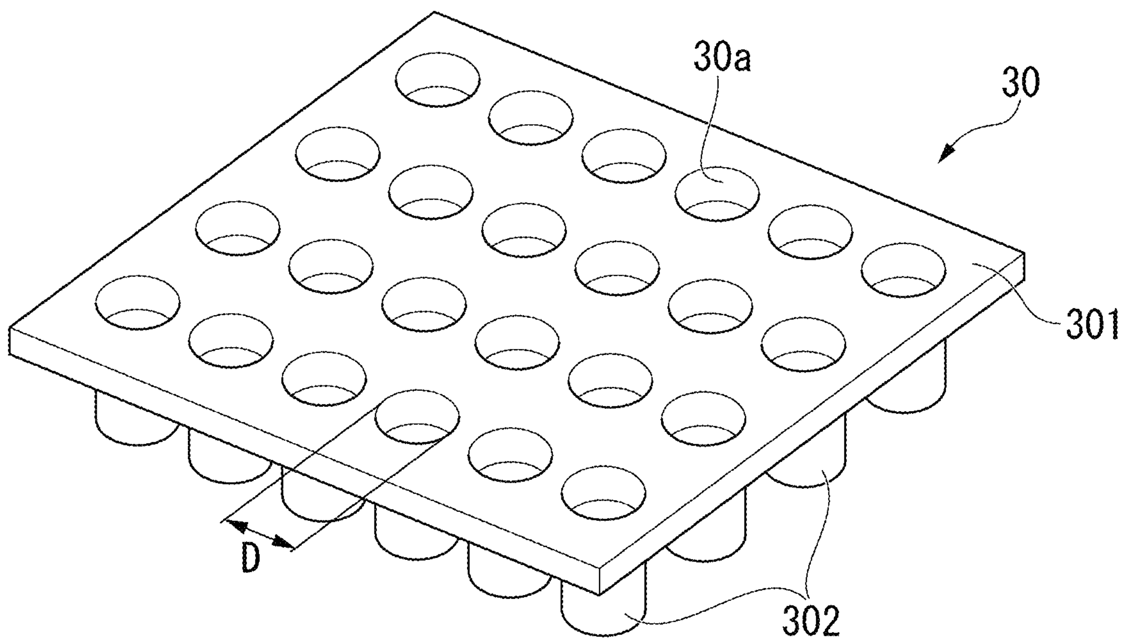
FIG. 3 is a schematic perspective view illustrating an adhesion portion 30.

FIG. 3 is a schematic perspective view illustrating the adhesion portion 30. The adhesion portion 30 includes a plate-shaped base portion 301 with a plurality of holes 30*a* and wells 302 provided to cover the lower part of the hole 30*a*. The well 302 is a recess portion covered with a wall portion and a bottom portion and open at the hole 30*a*.

The adhesion portion 30 is a so-called well plate in which a plurality of wells are arranged in a matrix shape at equal intervals.

In a case where such an adhesion portion 30 is used, when ejection head is disposed an upper part of the base portion 301 of the adhesion portion 30 and the liquid is ejected, the distance between the bottom of the well to which the liquid is adhered and the ejection head is large, and the position at which the liquid is adhered tends to shift.

Further, commercially available well plates have various variations with different numbers of wells. For example, the well plate is known to have a configuration in which the number of wells is 6 (6 wells), 12 (12 wells), 24 (24 wells), 48 (48 wells), and 96 (96 wells).

In the 96-well plate, which is the largest number, the opening diameter D of the holes 30*a* varies depending on the shape of the wells 302, but is set to substantially 6.5 mm to 7.0 mm. By using a cylindrical-shaped member having an outer diameter of 6.0 mm or less as the liquid holding portion 111 of the ejection head 110, the liquid droplet forming apparatus 1 can eject liquid droplets in a state in which the ejection head 110 is inserted into the well.

Mounting Portion

The adhesion portion 30 is mounted on the mounting portion 40. The mounting portion 40 includes an x-stage 41, a y-stage 42, and a base 43.

The x-stage 41 supports and fixes the adhesion portion 30. Further, the x-stage 41 moves the adhesion portion 30 horizontally in the x-axis direction.

The y-stage 42 moves the x-stage 41 horizontally in the y-axis direction.

The base 43 supports the y-stage 42.

The mounting portion 40 can employ a known configuration as the x and y stages.

Control Unit

The control unit 50 generates an electrical signal for operating each portion of the liquid droplet forming apparatus 1, and supplies and controls each portion. For example, the control unit 50 generates drive signals to be supplied to the ejecting portion and the mounting portion 40, and supplies the drive signals to each portion to control the operation of each portion.

Figure 4:
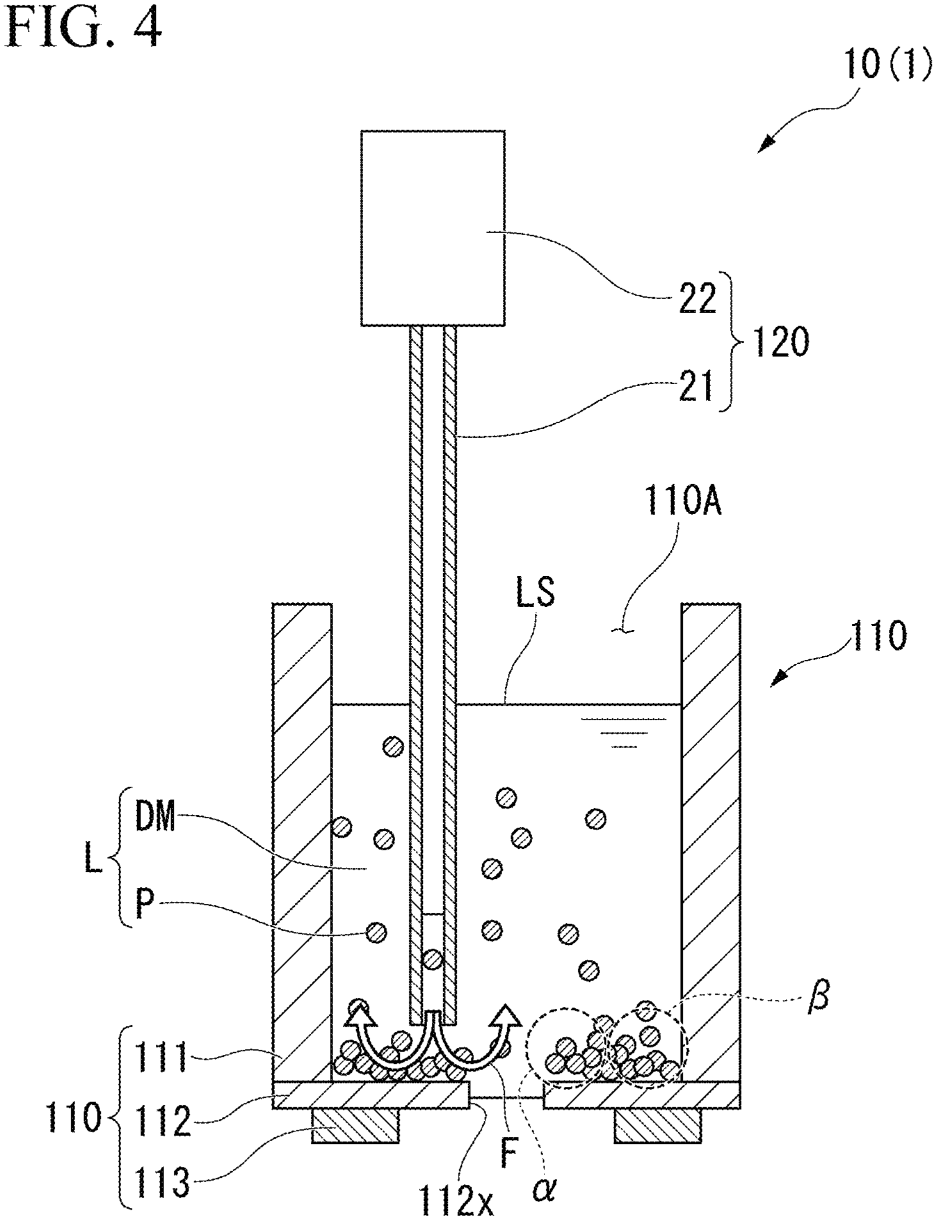
FIG. 4 is an explanatory view illustrating an operation of the liquid droplet forming apparatus 1.
Figure 5:
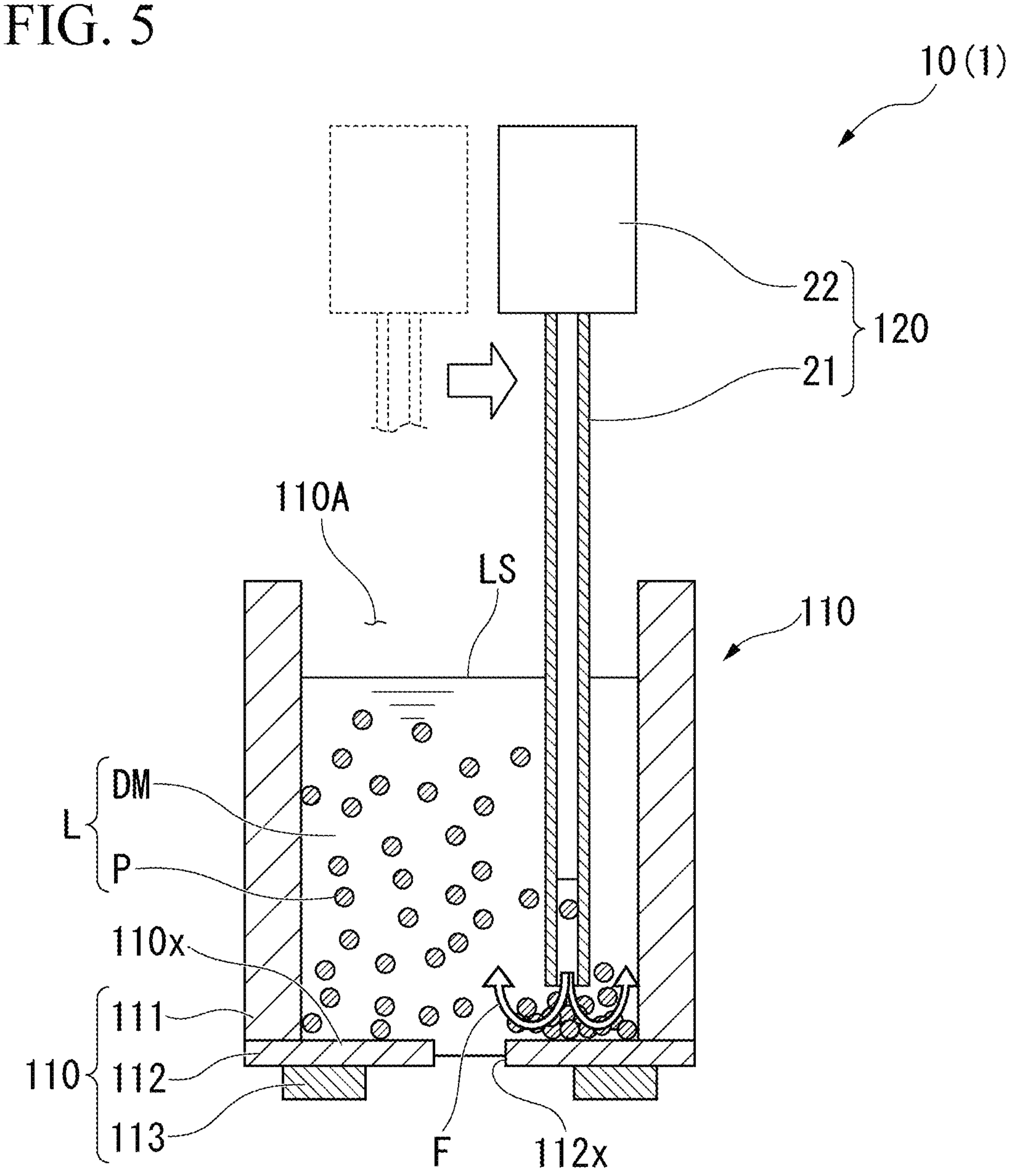
FIG. 5 is an explanatory view illustrating an operation of the liquid droplet forming apparatus 1.

Hereinafter, a characteristic operation of the liquid droplet forming apparatus 1 will be described with reference to the drawings. FIGS. 4 and 5 are explanatory views illustrating an operation of the liquid droplet forming apparatus 1.

As illustrated in FIG. 4, when a time elapses after the liquid holding portion 111 is filled with the liquid L, there is a case where the particles P settle and are accumulated on the bottom surface 110*x* of the liquid chamber 110A. When the liquid droplet ejection is started in such a state, the particles P, which are accumulated on the bottom surface 110*x* (see FIG. 2), especially near the ejection outlet 112*x* (indicated by a symbol a in the figure), are ejected at once, and the liquid droplet ejection becomes difficult in a state where the number of particles is controlled.

Further, even when a certain amount of liquid droplets are ejected in a state where the particles P have settled and the particles P at the position indicated by the symbol a are removed, the particles P tend to remain at the corner of the bottom surface 110*x*, specifically at a position where the liquid holding portion 111 and the nozzle plate 112 intersect (indicated by a symbol R in the figure). Therefore, when the liquid droplets are continuously ejected, there is a concern that the particles P at the position indicated by the symbol R may be mixed with the liquid droplets, and the droplet ejection becomes difficult in a state where the number of particles is controlled.

Therefore, in the liquid droplet forming apparatus 1, the particles P accumulated on the bottom surface 110*x* are dispersed in the liquid L before the liquid droplets are ejected, and then the liquid droplet ejection is performed.

First, as illustrated in FIG. 4, the posture controller (the moving unit 130) inserts the nozzle 121 of the stirrer 120 into the liquid chamber 110A based on a control signal supplied from the control unit 50. At this time, the tip of the nozzle 121 may be brought close to the bottom surface 110*x* without coming into contact with the bottom surface 110*x*.

Specifically, it is preferable that the tip of the nozzle 121 is brought closer to the bottom surface 110*x* to the same extent as the opening diameter of the nozzle 121. For example, when the inner diameter of the nozzle 121 is 0.6 mm, the tip of the nozzle 121 may be brought closer to a position 0.6 mm above the bottom surface 110*x*. In a case where the shape of the opening portion 121*x* (see FIG. 2) of the nozzle 121 is not a circular shape, the smallest rectangle that circumscribes the opening portion 121*x* is assumed, and the length of a short side of the rectangle is used as a determination criterion. For example, in a case where the shape of the opening portion 121*x* is an elliptical shape, it is preferable to bring the tip of the nozzle 121 close to a position above the bottom surface 110*x* by the length of the short side of the rectangle circumscribing the opening portion 121*x* (that is, the length of the short axis of the ellipse).

As a result, the moving unit 130 controls the position where the stirrer 120 sucks or discharges the liquid L in the liquid chamber 110A, specifically, the position of the nozzle 121 in the liquid chamber 110A.

Next, the stirrer 120 sucks the liquid L in the liquid chamber 110A from the nozzle 121 based on the control signal supplied from the control unit 50.

The suction amount of the liquid L by the stirrer 120 is preferably an amount by which a liquid surface LS of the liquid L in the liquid chamber 110A does not fall downward (on the bottom surface 110*x* side) below the opening portion 121*x*. For example, in a case where the liquid level LS is at a position with height of 6 mm from the bottom surface 110*x* and the opening portion 121*x* is at a position with height of 1 mm from the bottom surface 110*x*, it is preferable that the position of the height position of the liquid level LS is not equal to or lower than 1 mm from the bottom surface 110*x*.

The control unit 50 calculates a suction amount that satisfies the position of the liquid level LS, based on a liquid feeding amount per unit time by the liquid feeding portion 122 and the amount of the liquid L stored in the liquid chamber 110A. Alternatively, the control unit 50 stores the calculated suction amount described above. The control unit 50 can cause the stirrer 120 to perform a suction operation in which these suction amounts are satisfied.

Next, the stirrer 120 discharges the sucked liquid L into the liquid chamber 110A based on the control signal supplied from the control unit 50. As illustrated in FIG. 4, the liquid L discharged from the nozzle 121 forms a flow F of the liquid L and winds up the particles P accumulated on the bottom surface 110*x* facing the opening portion 121*x*. As a result, the liquid L in the liquid chamber 110A is stirred.

At this time, in a case where a set value of the liquid feeding amount at the time of discharge by the liquid feeding portion 122 exceeds a set value of the liquid feeding amount at the time of suction by the liquid feeding portion 122, air bubbles are discharged into the liquid L at the time of discharge. Therefore, it is preferable that the control unit 50 performs control such that the set value of the liquid feeding amount at the time of discharge does not exceed the set value of the liquid feeding amount at the time of suction.

Next, as illustrated in FIG. 5, the moving unit 130 moves the stirrer 120 based on the control signal supplied from the control unit 50 and moves the position of the nozzle 121 in the liquid chamber 110A. The position of the nozzle 121 after the movement can be the same as the description in FIG. 4.

Next, the stirrer 120 sucks and discharges the liquid L in the liquid chamber 110A from the nozzle 121 based on the control signal supplied from the control unit 50. The operation of suction and discharge of the liquid L can be the same as described in FIG. 4. Accordingly, the liquid L discharged from the nozzle 121 winds up the particles P accumulated on the bottom surface 110*x*, and the liquid L in the liquid chamber 110A is stirred. The operation of suction and discharge of the liquid L by the stirrer 120 is performed before the dispersed particles P in FIG. 4 are accumulated on the bottom surface 110*x* again.

When the suction and discharge of the liquid L are repeated by the stirrer 120, it is preferable to make the discharging amount smaller than the suction amount in the first suction and discharge operation and to hold the liquid L in the stirrer 120. In a case where the suction amount and the discharging amount of the liquid L are controlled to be the same amount in the second and subsequent suction and discharge operations in a state in which the stirrer 120 holds the liquid L, there is no concern about discharging air bubbles into the liquid L at the time of discharge of the liquid L, and the operation is stable.

The control unit 50 causes the stirrer 120 to suck and discharge the liquid L at a plurality of places in the liquid chamber 110A. For example, the control unit 50 preferably stirs the liquid L in the entire liquid chamber 110A by sucking and discharging the liquid L at the center of the bottom surface 110*x*, which has a circular shape in plan view, and at the plurality of places (for example, 4 places every 90 degrees in the circumferential direction) equally spaced around the center of the bottom surface 110*x*.

When the suction and discharge of the liquid L is performed at the plurality of places in the liquid chamber 110A, the order in which the suction and discharge of the liquid L is performed can be appropriately set.

The position where the liquid L is sucked and discharged by the stirrer 120 is not limited to the position described above and can be appropriately changed according to the shape or size of the liquid chamber 110A.

By repeating these operations, the stirrer 120 can eliminate the accumulation of the particles P on the bottom surface 110*x*, disperse the particles P, and stir the liquid L.

In a case where the stirring of the liquid L by the stirrer 120 is completed, the control unit 50 supplies the control signal to the moving unit 130 and extracts the nozzle 121 from the liquid chamber 110A before the ejection head 110 ejects the liquid L. Thereafter, the ejection head 110 ejects the liquid L.

When the liquid L is ejected from the ejection head 110, the nozzle plate 112 vibrates in the ejection head 110, and, together, the liquid L in the liquid holding portion 111 or the liquid chamber 110A vibrates. At this time, when the nozzle 121 is inserted into the liquid chamber 110A, the nozzle 121 also vibrates, and there is a concern that the vibration characteristics of the nozzle 121 may affect the formation of the liquid droplets. In the liquid droplet forming apparatus 1, as described above, by extracting the nozzle 121 from the liquid chamber 110A before the ejection of the liquid droplets, the formation of liquid droplets can be easily stabilized.

Due to these operations, the liquid L held in the liquid chamber 110A is stirred and the particles P are suitably dispersed. Therefore, according to the liquid droplet forming apparatus 1 configured as described above, it is possible to stably eject the dispersion liquid, as liquid droplets, containing the settling particles having constant concentration.

Second Embodiment

Figure 6:
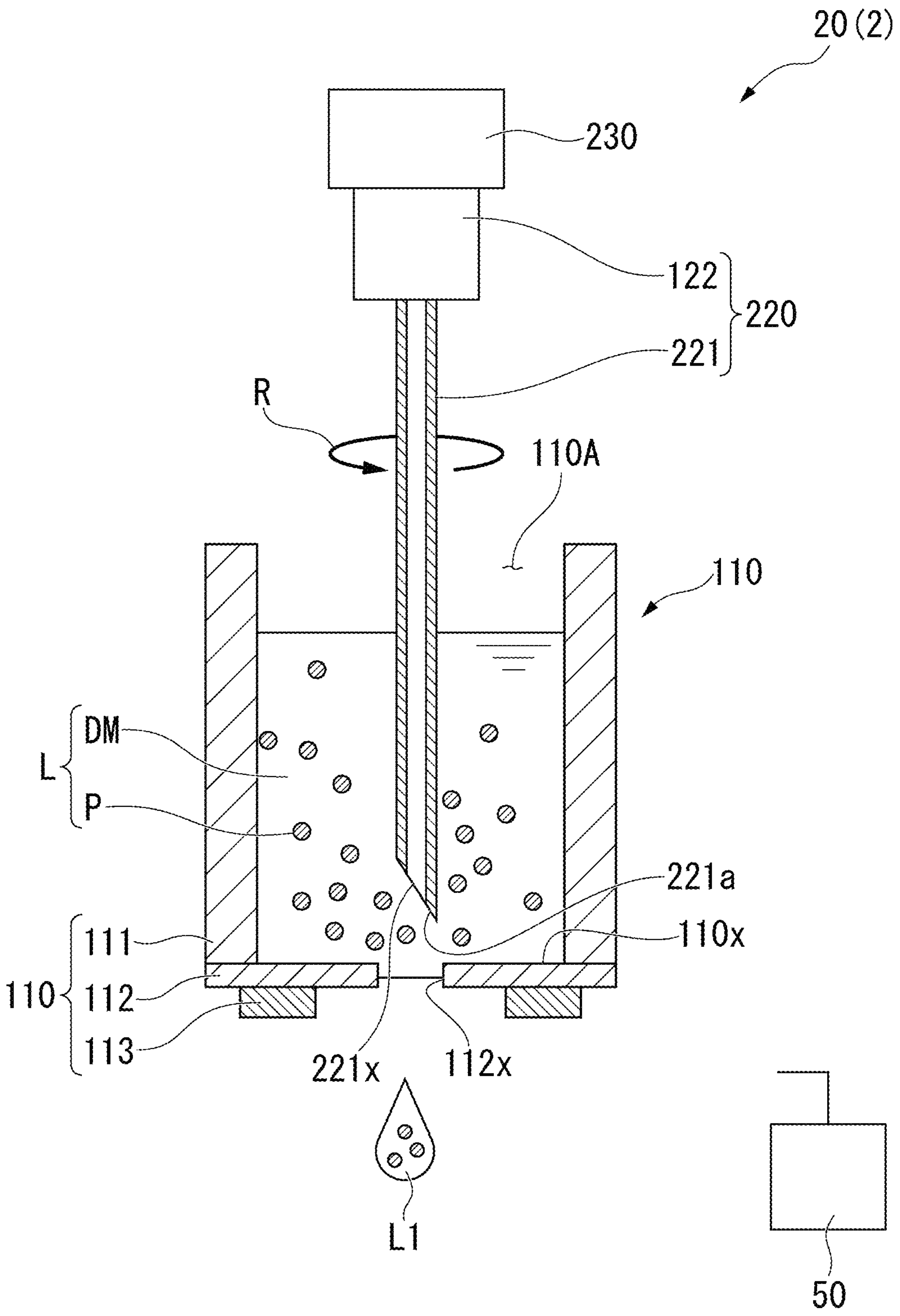
FIG. 6 is a schematic view of a liquid droplet forming apparatus 2 of a second embodiment.
Figure 7:
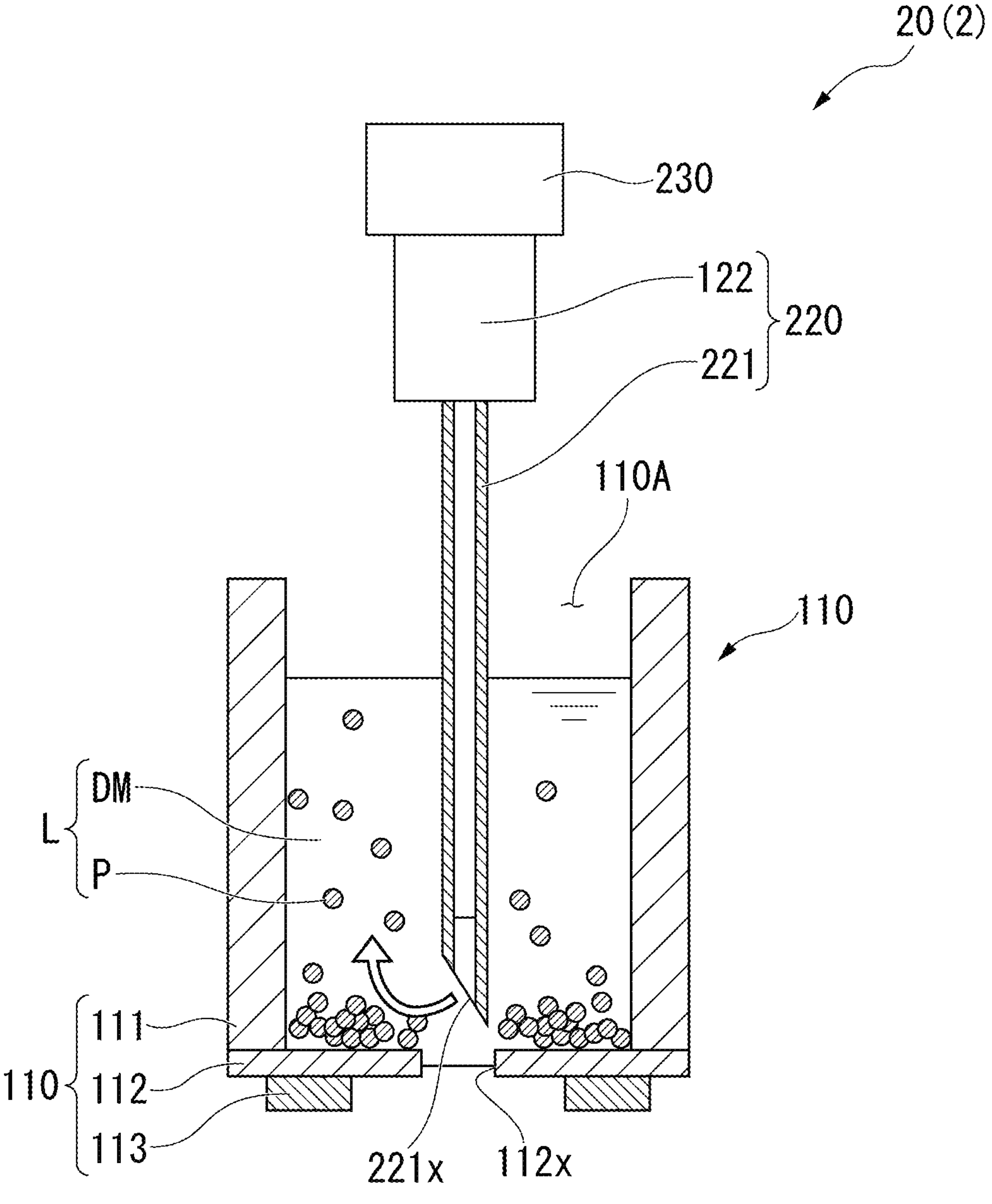
FIG. 7 is an explanatory view illustrating an operation of the liquid droplet forming apparatus 2.
Figure 8:
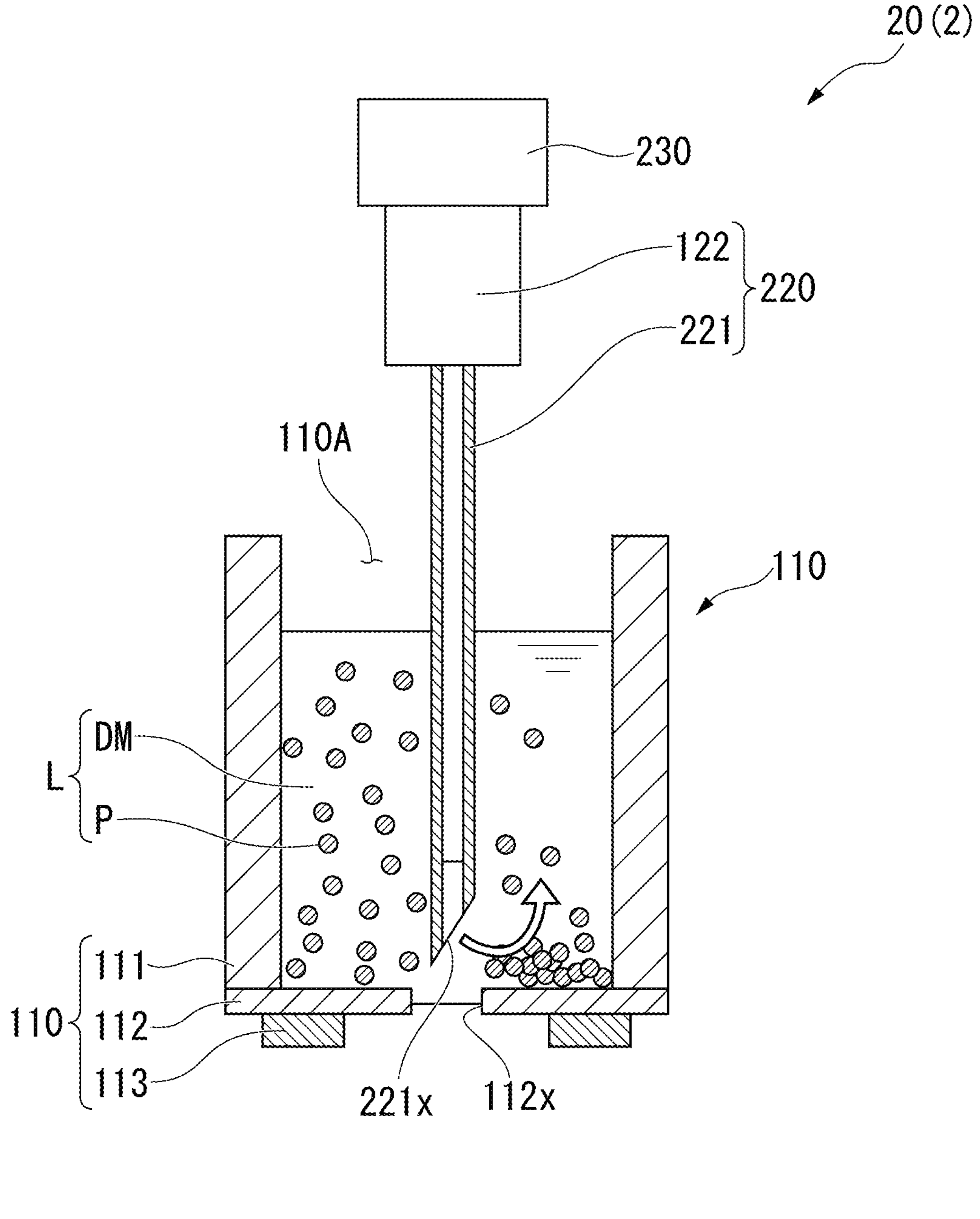
FIG. 8 is an explanatory view illustrating an operation of the liquid droplet forming apparatus 2.

FIGS. 6 to 8 are explanatory views of a liquid droplet forming apparatus 2 according to a second embodiment of the present invention. In the present embodiment, the same reference symbols are given to the same component elements as in the first embodiment, and detailed description thereof will be omitted.

FIG. 6 is a schematic view of a configuration of a part of the ejecting portion 20 included in the liquid droplet forming apparatus 2 of the present embodiment and is a view corresponding to FIG. 2.

The ejecting portion 20 includes an ejection head 110, stirrer 220, and moving unit 230. In addition, the ejecting portion 20 may further have the same configuration as the moving unit 130 of the first embodiment.

Stirrer

The stirrer 220 includes a nozzle (tube-like member) 221 and a liquid feeding portion 122 and stirs the liquid L held in the liquid chamber 110A. The nozzle 221 is inserted into the liquid chamber 110A. The liquid feeding portion 122 sucks or discharges the liquid L stored in the liquid chamber 110A via the nozzle 121.

The nozzle 221 is a tube-shaped member forming a flow path of the liquid L in the liquid chamber 110A, and the tip 221*a* is formed as a surface obliquely intersecting a central axis of the nozzle 221. Accordingly, the opening portion 221*x* of the nozzle 221 is open in a direction intersecting the central axis of the nozzle 221.

Moving Unit

The moving unit 230 rotates the stirrer 220 around the central axis of the nozzle 221. As a result, the moving unit 230 changes an orientation of the opening portion 221*x* in the liquid chamber 110A in the circumferential direction of the central axis of the nozzle 221.

The moving unit 230 may rotate the entire stirrer 220 or may rotate only the nozzle 221.

FIGS. 7 and 8 are explanatory views illustrating an operation of the liquid droplet forming apparatus 2.

First, as illustrated in FIG. 7, the moving unit 130 (see FIG. 1), which is posture controller, inserts the nozzle 221 of the stirrer 220 into the liquid chamber 110A based on the control signal supplied from the control unit 50. For example, the moving unit 130 positions the tip of the nozzle 221 at the center of the bottom surface 110*x* in plan view.

The opening portion 221*x* of the nozzle 221 is open in a direction intersecting the central axis of the nozzle 221. Therefore, in the nozzle 221 positioned at the center of the bottom surface 110*x*, the opening portion 221*x* is open toward the corner of the bottom surface 110*x* instead of the center of the bottom surface 110*x*.

Next, the stirrer 220 sucks and discharges the liquid L in the liquid chamber 110A from the nozzle 221 based on the control signal supplied from the control unit 50. The liquid L discharged from the nozzle 221 forms a flow F of the liquid L and winds up the particles P accumulated on the bottom surface 110*x* facing the opening portion 221*x*. As a result, the liquid L in the liquid chamber 110A is stirred.

Next, as illustrated in FIG. 8, the moving unit 230, which is the posture controller, rotates the stirrer 220 based on the control signal supplied from the control unit 50 and changes the opening direction of the nozzle 221 in the liquid chamber 110A. As a result, the moving unit 230 controls a direction in which the stirrer 220 sucks or discharges the liquid L in the liquid chamber 110A, specifically, an opening direction of the opening portion 221*x* of the nozzle 221 in the liquid chamber 110A.

Next, the stirrer 220 sucks and discharges the liquid L in the liquid chamber 110A from the nozzle 221 based on the control signal supplied from the control unit 50. The operation of suction and discharge of the liquid L can be the same as described in FIG. 4. Accordingly, the liquid L discharged from the nozzle 221 winds up the particles P accumulated on the bottom surface 110*x*, and the liquid L in the liquid chamber 110A is stirred.

The control unit 50 causes the stirrer 220 to suck and discharge the liquid L in a plurality of directions in the liquid chamber 110A. For example, the control unit 50 preferably stirs the liquid L in the entire liquid chamber 110A by sucking and discharging the liquid L in the plurality of directions (for example, 4 directions every 90° in the circumferential direction) equally spaced around the center of the bottom surface 110*x*.

When the suction and discharge of the liquid L is performed at the plurality of directions in the liquid chamber 110A, the order in which the suction and discharge of the liquid L is performed can be appropriately set.

The direction in which the liquid L is sucked and discharged by the stirrer 220 can be appropriately changed according to the shape or size of the liquid chamber 110A.

By repeating these operations, the stirrer 220 can eliminate the accumulation of the particles P on the bottom surface 110*x*, disperse the particles P, and stir the liquid L.

In a case where the stirring of the liquid L by the stirrer 220 is completed, the control unit 50 supplies the control signal to the moving unit 130 and extracts the nozzle 221 from the liquid chamber 110A before the ejection head 110 ejects the liquid L. Thereafter, the ejection head 110 ejects the liquid L.

Due to these operations, the liquid L held in the liquid chamber 110A is stirred and the particles P are suitably dispersed. Therefore, according to the liquid droplet forming apparatus 2 configured as described above, it is possible to stably eject the dispersion liquid, as liquid droplets, containing the settling particles having constant concentration.

In the above embodiment, although the posture controller controls any one of the position and the direction where the stirrer sucks and discharges the liquid L in the liquid chamber 110A, the present embodiment is not limited to this. For example, in the liquid droplet forming apparatus 2 of the second embodiment, the tip position of the nozzle 221 may be changed in the liquid chamber 110A using the moving unit 130 without fixing the tip position of the nozzle 221 to the center of the bottom surface 110*x* in plan view.

Further, in the above embodiment, although the stirrer discharges the liquid L in the same posture (nozzle position and nozzle opening direction) as when the liquid L is sucked, the present embodiment is not limited to this. For example, after the liquid L is sucked by the stirrer, the posture of the stirrer may be changed by the posture controller, and then the stirrer may discharge the liquid L. Further, in the second embodiment, the orientation of the opening portion 221*x* of the nozzle 221 may be changed by the moving unit 230 while the stirrer sucks and discharges the liquid L. Even in a case where the liquid droplet forming apparatus performs such an operation, the effect of the present invention can be exhibited.

As described above, although the preferred examples of the embodiments according to the present invention have been described with reference to the accompanying drawings, the present invention is not limited to such examples. The variety of shapes, combinations, and the like of the individual constituent members described in the above-described examples are examples, and a variety of modifications are permitted based on design requirements and the like without departing from the gist of the present invention.

The present invention includes the following aspects.

[1] A liquid droplet forming apparatus includes: an ejection head that has a liquid chamber storing liquid containing settling particles and that ejects a liquid droplet of the liquid; stirrer for stirring the liquid held in the liquid chamber; posture controller for controlling a posture of the stirrer; and a control unit that controls operations of the ejection head, the stirrer, and the posture controller, in which the stirrer includes a tube-like member inserted into the liquid chamber, and a liquid feeding portion that sucks or discharges the liquid stored in the liquid chamber via the tube-like member, and the posture controller controls one or both of the position and the direction in which the stirrer sucks and discharges the liquid in the liquid chamber.

[2] In the liquid droplet forming apparatus according to [1], the posture controller changes a position of the tube-like member in the liquid chamber.

[3] In the liquid droplet forming apparatus according to [1] or [2], an opening portion of the tube-like member on a tip side is open in a direction intersecting a central axis of the tube-like member, and the posture controller changes an orientation of the opening portion in the liquid chamber in a circumferential direction of the central axis.

[4] In the liquid droplet forming apparatus according to any one of [1] to [3], the control unit causes the posture controller to extract the tube-like member from the liquid chamber before the liquid is ejected from the ejection head.

[5] In the liquid droplet forming apparatus according to any one of [1] to [4], the ejection head includes a liquid holding portion that holds the liquid, and a film-like member that includes an ejection outlet for ejecting the liquid droplet and that forms the liquid chamber together with the liquid holding portion, the liquid holding portion is a cylindrical-shaped member, and an outer diameter of the liquid holding portion is 6 mm or less.

EXPLANATION OF REFERENCES

- 1, 2 liquid droplet forming apparatus
- 11, 110 ejection head
- 50 control unit
- 110A liquid chamber
- 111 liquid holding portion
- 112 nozzle plate (film-like member)
- 112*x* ejection outlet
- 120, 220 stirrer
- 121, 221 nozzle (tube-like member)
- 121*x*, 221*x* opening portion
- 122 liquid feeding portion
- 221*a* tip
- L liquid
- L1 liquid droplet
- P particle

What is claimed is:

1. A liquid droplet forming apparatus comprising:

an ejection head that has a liquid chamber storing liquid containing settling particles and that ejects a liquid droplet of the liquid;

a stirrer for stirring the liquid held in the liquid chamber;

posture control circuitry configured to control a posture of the stirrer; and a control circuitry configured to control operations of the ejection head, the stirrer, and the posture control circuitry, wherein the stirrer includes a tube inserted into the liquid chamber, and a liquid feeding portion that sucks or discharges the liquid stored in the liquid chamber via the tube, and the posture control circuitry controls a direction in which the stirrer sucks and discharges the liquid in the liquid chamber, wherein:

an opening portion of the tube on a tip side is open in a direction intersecting a central axis of the tube, and the posture control circuitry changes an orientation of the opening portion in the liquid chamber in a circumferential direction of the central axis.

2. The liquid droplet forming apparatus according to claim 1, wherein the posture control circuitry changes a position of the tube in the liquid chamber.

3. The liquid droplet forming apparatus according to claim 1, wherein:

the control circuitry causes the posture control circuitry to extract the tube from the liquid chamber before the liquid is ejected from the ejection head.

4. The liquid droplet forming apparatus according to claim 1, wherein:

the ejection head includes:

a liquid holding portion that holds the liquid, and a film that includes an ejection outlet for ejecting the liquid droplet and that forms the liquid chamber together with the liquid holding portion, the liquid holding portion is cylindrically shaped, and an outer diameter of the liquid holding portion is 6 mm or less.

5. The liquid droplet forming apparatus according to claim 1, wherein:

the settling particles are cells.

6. The liquid droplet forming apparatus according to claim 1, wherein:

an outer diameter of the tube is ½ or less of an inner diameter of the liquid chamber.

7. The liquid droplet forming apparatus according to claim 1, wherein:

the control circuitry is further configured to cause the stirrer to move a tip of the tube to a position above a bottom surface of the liquid chamber by a distance equal to an inner diameter of the tube.

8. The liquid droplet forming apparatus according to claim 1, wherein:

the control circuitry is further configured to maintain a liquid level in the liquid chamber at a height equal to or higher than a height of the opening portion of the tube during suction.

9. The liquid droplet forming apparatus according to claim 1, wherein:

the posture control circuitry is further configured to move the tube to a plurality of equally spaced places in a circumferential direction within the liquid chamber to stir the liquid.

10. The liquid droplet forming apparatus according to claim 1, wherein:

the control circuitry is further configured to cause the liquid feeding portion to set a first discharge amount to be smaller than a first suction amount in an initial stirring operation to hold liquid in the tube.

* * * * *